United States Patent [19]

Shibata

[11] 4,139,983
[45] Feb. 20, 1979

[54] SECONDARY AIR CONTROL VALVE DEVICE

[75] Inventor: Norio Shibata, Susono, Japan

[73] Assignee: Toyota Jidosha Kogyo Kabushiki Kaisha, Toyota, Japan

[21] Appl. No.: 826,246

[22] Filed: Aug. 19, 1977

[30] Foreign Application Priority Data

Apr. 13, 1977 [JP] Japan .................................. 52-41546

[51] Int. Cl.² .............................................. F01N 3/10
[52] U.S. Cl. ..................................................... 60/290
[58] Field of Search .................................. 60/290, 289

[56] References Cited

U.S. PATENT DOCUMENTS

| | | | |
|---|---|---|---|
| 3,945,205 | 3/1976 | Atago | 60/290 |
| 3,948,045 | 4/1976 | Budinski | 60/290 |
| 3,975,905 | 8/1976 | Shimo | 60/290 |
| 3,992,878 | 11/1976 | Moorman | 60/290 |
| 4,007,756 | 2/1977 | Umino | 60/290 |
| 4,070,830 | 1/1978 | Beiswenger | 60/290 |

Primary Examiner—Douglas Hart
Attorney, Agent, or Firm—Stevens, Davis, Miller & Mosher

[57] ABSTRACT

Disclosed is a secondary air control valve device for feeding secondary air controlled in correspondence with the engine load into an exhaust system having a catalytic converter for reducing hydrocarbons (HC), carbon monoxide (CO) and nitrogen oxides ($NO_x$) contained in exhaust gas emitted from an internal combustion engine. The device is simple in construction and can vary the predetermined amount of secondary air in correspondence with the changes of the characteristic of the catalyzer which may vary as the catalyzer is activated, so that the amount of the secondary air is controlled for maintaining the highest converting efficiency for a long duration of use of the vehicle which has this device mounted thereon.

5 Claims, 3 Drawing Figures

SECONDARY AIR CONTROL VALVE DEVICE

BRIEF DESCRIPTION OF THE INVENTION

This invention relates to a secondary air control valve device for feeding secondary air into a catalytic converter disposed within the exhaust system of an internal combustion engine. More particularly, this invention relates to a secondary air control valve device for feeding secondary air controlled in correspondence with changes in the engine load into an exhaust system having a catalyzer mounted therein for reducing undesirable components such as hydrocarbons (HC), carbon monoxide (CO) and nitrogen oxides ($NO_x$) contained in the exhaust gas emitted from an internal combustion engine.

Methods are well known by which harmful contaminants, especially HC, CO, contained in the exhaust gas emitted from an internal combustion engine, are oxidized by the secondary air while utilizing a catalytic converter and by which the content of the above-mentioned harmful contaminants is reduced in the exhaust gas.

In such an exhaust gas purifying method, which comprises a secondary air supply and an oxidizing reaction in the exhaust system utilizing a catalytic converter, there is tendency for the converting efficiency to depend on both the secondary air fuel ratio measured when oxidation occurs and the exhaust gas temperature. It is, therefore, necessary to suitably control both the secondary air fuel ratio, which is defined by the total amount of air, which includes the secondary air, and the amount of the fuel fed into the engine, and the sufficient temperature of the exhaust gas for causing a good reaction. For achieving this end, it is effective to control the amount of the secondary air in correspondence with the engine load.

Many methods and devices are proposed for controlling the amount of the secondary air in correspondence with the engine load. Usually, in these cases, the secondary air is controlled to give a constant secondary air fuel ratio in accordance with the engine load. The inventor of this present invention has, however, found that it is not sufficient enough to control only the amount of the secondary air for obtaining a constant secondary air fuel ratio in correspondence with the engine load in order to maintain an adequate level of the exhaust gas converting efficiency for a long duration, because in exhaust gas purifying systems utilizing a catalyzer, the characteristics of the catalyzer used changes slowly with duration of activation. It was confirmed that it was necessary to also control the amount of the secondary air in correspondence with the changes of the characteristic of the catalyzer. It was also confirmed that it is desirable to use the compensated changes in the characteristic of the catalyzer to control the secondary air fuel ratio a little toward the lean side rather than controlling the initial air fuel ratio as the catalyzer is used.

SUMMARY OF THE INVENTION

A principal object of the present invention is to provide a secondary air control valve device which is applicable to an exhaust gas purifying system utilizing a catalytic converter such as an oxidizing catalyzer or a three-way catalyzer for reducing the HC, CO, and in some cases, the $NO_x$ components contained in the exhaust gas.

Another object of the present invention is to provide a secondary air control valve device which controls the amount of the secondary air in correspondence with the engine load.

A further object of the present invention is to provide a secondary air control valve device which is capable of varying the predetermined amount of secondary air in correspondence with the changing characteristic of the catalyzer so that the amount of the secondary air is controlled for maintaining the highest converting efficiency for a long duration of utilizing the vehicle on which the internal combustion engine having a secondary air control valve device according to the present invention is mounted.

Still another object of the present invention is to provide a secondary air control valve device having a simple construction.

The above-mentioned objects and other further objects, as well as novel features, of the present invention will become more fully apparent from the detailed description of the same, set forth below, with reference to the accompanying drawings. It is to be understood, however, that the drawings are for the purpose of illustration only and are not intended to be a definition of the limits of the invention.

DETAILED DESCRIPTION OF THE INVENTION

In the following description, it is assumed that a carburetor, which supplies a gas mixture comprising fuel and air into an engine, is selected to generate a certain predetermined air fuel ratio. This condition is, however, very similar to conditions under which actual carburetors are utilized. Under the above-mentioned conditions of this invention, an appropriate secondary fuel air ratio is obtained by controlling the secondary air feed in correspondence with the amount of intake air of the engine.

A back pressure control method is one of the useful methods for applying to the above-mentioned secondary air control to practical operations. This control method is based on the following facts. It is known that the value of the pressure (P) in an exhaust system of an engine, so-called back pressure, is proportional to the square of the amount (Q) of the intake air of the engine. In addition, it is known that, when a throttling element, such as an orifice or a nozzle, is disposed in a fluid feed line, the pressure difference between the pressure located upstream and the pressure located downstream of the point of contraction caused by the throttling element is proportional to the amount of the flow which passes through the throttling element.

Therefore, when a throttling element is disposed in a secondary air feed line and the pressure difference between the upstream and the downstream pressures of the throttling element is adjusted to be proportional to the back pressure of the engine, the secondary air fuel ratio can then be suitably controlled.

Figure 1:
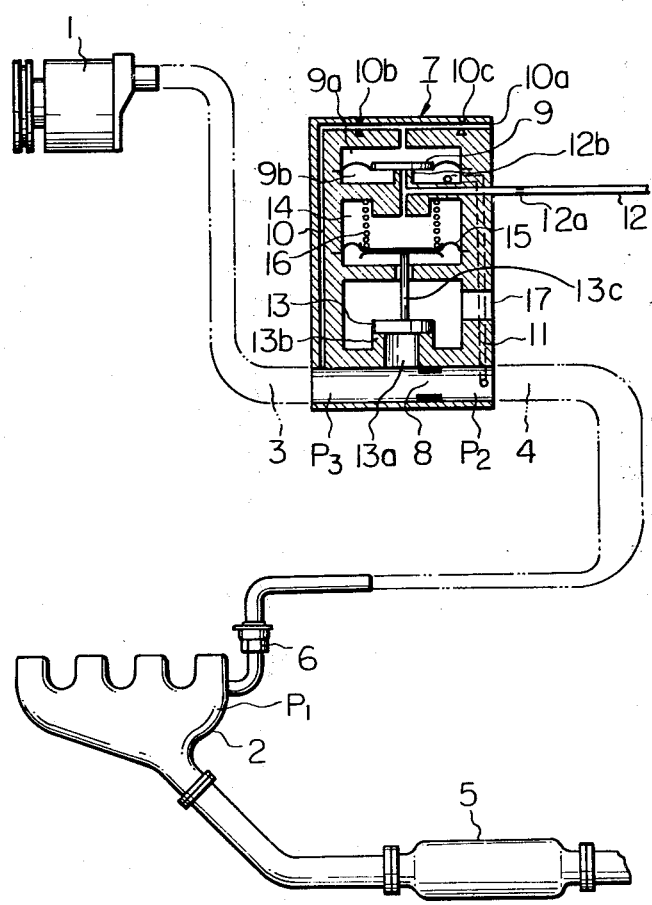
FIG. 1 is a schematic view of a secondary air control valve device according to the present invention.

A secondary air control valve device according to the present invention is hereinafter explained in detail with reference to the accompanying FIG. 1. An air pump 1, which is disposed at the proximity of an air cleaner (not shown), is connected to an exhaust manifold 2 or an exhaust pipe of an engine (not shown) via secondary air feed pipes 3 and 4. A secondary air control valve device 7 for controlling the air feed of secondary air is disposed at a position connecting the secondary air feed pipes 3 and 4. A check valve 6 is disposed at a position between the secondary air control valve device 7 and the exhaust manifold 2 for preventing the exhaust gas from flowing in a reverse direction away from the exhaust manifold 2 toward the secondary air control valve device 7. The back pressure $P_1$ of the engine is measured in the exhaust manifold 2. A catalytic converter (not shown), such as an oxidizing catalyzer for reducing CO and HC components or a three-way catalyzer for reducing CO, HC and $NO_x$ components, is disposed at a suitable position, such as in a sub-muffler 5, between the exhaust manifold 2 and a muffler (not shown).

The secondary air control valve device 7 includes a measuring orifice 8 and a diaphragm valve 9 for adjusting the vacuum pressure for actuating an air relief valve 13 by means of the pressure difference $P_3 - P_2$ occurring between the pressure $P_3$ located upstream of the measuring orifice 8 and the pressure $P_2$ located downstream of the measuring orifice 8. The secondary air control valve device 7 is also provided therein with an upstream pressure dividing line 10 and a downstream pressure dividing line 11. One end of the upstream pressure dividing line 10 opens at a position disposed upstream of the orifice 8, and the other end of the dividing line 10 is connected to an upper chamber 9a partitioned by the diaphragm valve 9. One end of the downstream pressure dividing line 11 opens at a position disposed downstream of the orifice 8, and the other end of the sensing line 11 is connected to a lower chamber 9b partitioned by the diaphragm valve 9.

One end of the upstream pressure dividing line 10 is connected to an opening 10a, which is exposed to the atmosphere via a throttling element 10c, and has a flow resistor 10b at a position upstream of the upper chamber 9a. When the flow resistances of the resistor 10b and the throttling element 10c are adjusted to have a predetermined ratio, the pressure in the upper chamber 9a is a divided pressure $1/cP_3$ (in which c is a proportional constant), which then divides the upstream pressure $P_3$ into an adequate ratio $1/c$.

A vacuum supply pipe 12, an end of which is connected to a vacuum source (not shown) such as an intake manifold of the engine, opens to the lower chamber 9b and an air relief valve actuating chamber 14 through a valve seat 12b, and includes a throttling element such as an orifice 12a mounted therein.

The air relief valve actuating chamber 14 has a diaphragm 15, which is connected to the air relief valve 13 with a rod 13c, and a spring 16, which urges the diaphragm downwardly. The air relief valve 13 controls the amount of air relieved from upstream of the orifice 8 to an opening 17 in correspondence to the displacement of the diaphragm 15 displaced by means of a vacuum signal supplied through the vacuum supply pipe 12.

It was described above that when the pressure difference $P_3 - P_2$ between the upstream and downstream pressures of the measuring orifice 8 is proportional with the back pressure $P_1$ of the engine, the secondary air fuel ratio can be appropriately controlled.

When the pressure loss $P_2 - P_1$, caused by the check valve 6 and the secondary air feed pipe 4, is kept sufficiently low, the back pressure $P_1$ of the engine can be replaced by the downstream pressure $P_2$ of the orifice 8. In this case, the downstream pressure dividing line 11 can be built in the air control valve device 7. The necessary characteristic required for the secondary air feed valve device 7, therefore, is that the pressure difference $P_3 - P_2$ be proportional to the pressure $P_2$, and be represented as follows:

$$P_3 - P_2 = c'P_2$$

or $$P_2 = 1/cP_3$$

wherein, c and c' are proportional constants.

Figure 2:
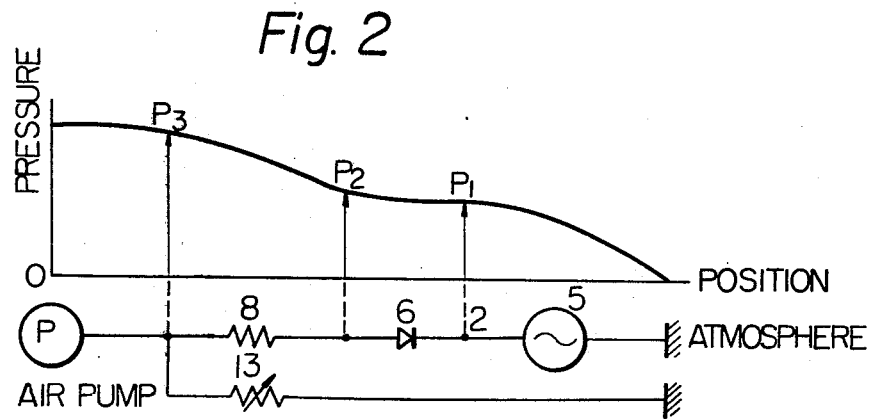
FIG. 2 is a diagram of an equivalent circuit of the device shown in FIG. 1 presented in conjunction with a corresponding pressure diagram of the same.
Figure 3:
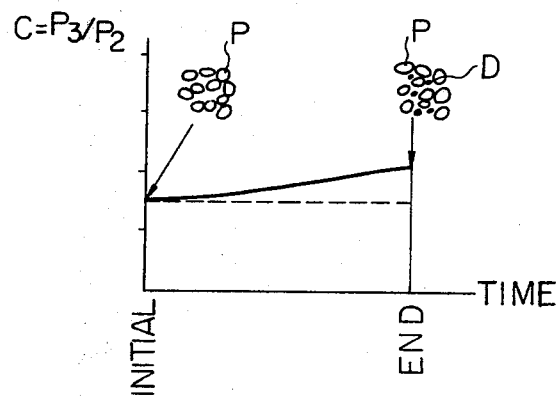
FIG. 3 is a diagram showing the relationships between the control characteristic of the control valve device according to the present invention and the passage of time of the same, and also showing a diagrammatical enlarged view of a dividing resistor installed in the device shown in FIG. 1.

In the secondary air control valve device 7, shown in FIG. 3, when $P_2$ is larger than $1/cP_3$, this means that the pressure in the lower chamber 9b is higher than that in the upper chamber 9a of the diaphragm 9, the diaphragm 9 moves upwardly so that the vacuum pressure, introduced through the vacuum supply pipe 12, is communicated to the secondary air feed pipe 4 via the downstream pressure dividing line 11. Thereby, the vacuum pressure in the air relief valve actuating chamber 14 is lowered. Then, the air relief valve 13 is caused to sit on the valve seat 13b, thus resulting in that all the secondary air, fed from the air supply pump 1, is fed into the exhaust manifold 2. This condition corresponds to a phenomenon in which the resistance of the air relief valve 13 is set to be indefinitely large, in the equivalent circuit shown in FIG. 2.

When $P_2$ is smaller than $1/cP_3$, (this means that the pressure in the lower chamber 9b is lower than that in the upper chamber 9b), the diaphragm 9 will then be caused to sit on the valve seat 12b. The vacuum pressure, introduced through the vacuum supply pipe 12, raises the diaphragm 15 against the spring 16. Then, the air relief valve 13, which is connected to the diaphragm 15, is raised so that excessive air is relieved through a clearance formed between the air relief valve 13 and the valve seat 13b. This condition corresponds to a phenomenon of the air relief process through the air relief valve 13 having a certain resistance in the equivalent circuit shown in FIG. 2. Consequently, the secondary air which is fed to the catalytic converter, becomes proportional to the engine load.

It is apparent from the above description that the air relief valve 13 opens by way of vacuum pressure against the urging force of the spring 16. The intake pressure of the engine can be utilized as a source of the vacuum pressure as described in the embodiment. The intake pressure of the engine reaches the level of a high vacuum, such as that represented by the level of several hundreds of millimeters of Hg, when the engine is idling. On the contrary this intake pressure of the engine reaches the level of a low vacuum, such as about around the level of several tens of millimeters of Hg, when the engine is rotated with a heavy load. In the former case, excessive air must be relieved because the engine load is low. However, in the latter case, since a large amount of secondary air is necessary, the air relief valve must be shut. Utilizing the intake pressure of the engine as the vacuum pressure of the secondary air feed control valve device 7, these requirements are satisfied so that the high vacuum pressure, in the former case, can be used to open the air relief valve; and that, in the latter case, the urging force of the spring can be used to shut the air relief valve.

In the present invention, the resistor 10b, which is disposed in a divided upstream sensing line 10, is constructed with porous materials, such as a sintered metal or with layered nets. As shown in FIG. 3, this construction allows minute particles D, such as dust, in the secondary air to adhere on surfaces of particles P of metals such as the sintered metal, which constitutes the resistor 10b, so that the flow resistance of the resistor 10b is increased as it is used. This means that the above-described proportional constant c increases as the resistor is used as shown by the diagram in FIG. 3, and that the diaphragm 9 allows the relief valve 13 to sit on the valve seat 13b with a pressure lower than that needed when the device is initially used. When the resistor 10b is made of a sintered metal, for example, brass having particles with a particle diameter of between 30 μ and 100 μ, the ratio of the opening area, defined as the ratio between the area of the particles and that of the clearance, may be within between 0.01 and 0.1. The throttling device 10c may also be made of sintered metal as the resistor 10b is. However, only a simple resistor, which can cause the contraction of the flow path, may be utilized for the throttling device 10c. This is because the throttling device 10c is less influenced by the dust for the secondary air.

Various conditions of utilizing the vehicles are the principal factors which vary the characteristic of the catalyzer. The factor which varies the characteristic of the catalyzer the most is the duration of its operation. Since, as mentioned above, the secondary air control valve device according to the present invention divides the upstream pressure of the measuring orifice and compares the divided upstream pressure with the downstream pressure of the measuring orifice according to the above-mentioned manner, the proportional constant for comparison can be automatically varied in correspondence with the various conditions of utilizing the vehicle.

Therefore, according to the present invention, an appropriate amount of secondary air, which is required for effecting a high converting efficiency, can be fed to the catalyzer for a long duration, so that CO, HC and $NO_x$ components, by means of the catalyzer, can be reduced effectively over a long duration of time for maintaining good engine performance.

What we claim is:

1. A secondary air control valve device for feeding secondary air, controlled in correspondence with the engine load, into a catalytic converter disposed within an exhaust system of said engine is characterized in that said secondary air control valve device comprises a measuring orifice disposed in a secondary air feed line, and an air relief valve disposed at the proximity of said measuring orifice, wherein said relief valve is actuated by way of a vacuum pressure which is modulated by a modulating diaphragm valve, an upper chamber partitioned by said modulating diaphragm valve is connected to said secondary air feeding line at a position disposed upstream of said measuring orifice through a pressure dividing line having a pressure dividing resistor therein, one end of said pressure dividing line is exposed to the atmosphere via a throttling device, and a lower chamber partitioned by said modulating diaphragm valve is connected to said secondary air feed line at a position disposed downstream of said measuring orifice so that the pressure affecting the upper surface of said modulating diaphragm is a divided pressure of the upstream pressure into a predetermined ratio, that said air relief valve is actuated by said vacuum pressure so as to maintain the pressures affecting both upper and lower surfaces of said modulating diaphragm to be substantially equal, and that said pressure dividing resistor disposed within said pressure dividing line is variable with the passage of time so as to increase the feeding amount of said secondary air.

2. A secondary air feed control valve device according to claim 1, wherein said pressure dividing resistor mounted within said pressure dividing line is made of a sintered metal.

3. A secondary air control valve device according to claim 2, wherein said sintered metal is made of brass having particles exhibiting a particle diameter of between 30 μ and 100 μ.

4. A secondary air control valve device according to claim 1, wherein said control valve further comprises a diaphragm connected to said air relief valve.

5. A secondary air feed control valve device according to claim 1, wherein said vacuum pressure is introduced from the intake manifold of said engine.

* * * * *